United States Patent
Iwata et al.

(10) Patent No.: US 11,951,917 B2
(45) Date of Patent: Apr. 9, 2024

(54) ONBOARD COMMUNICATION SYSTEM, SWITCHING DEVICE, AND CONTROL METHOD

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Akihito Iwata, Osaka (JP); Takeshi Hagihara, Yokkaichi (JP); Darmawan Go, Yokkaichi (JP); Yosuke Shimizu, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 222 days.

(21) Appl. No.: 17/616,347

(22) PCT Filed: May 7, 2020

(86) PCT No.: PCT/JP2020/018516
§ 371 (c)(1),
(2) Date: Dec. 3, 2021

(87) PCT Pub. No.: WO2021/009996
PCT Pub. Date: Jan. 21, 2021

(65) Prior Publication Data
US 2022/0242338 A1    Aug. 4, 2022

(30) Foreign Application Priority Data

Jul. 17, 2019 (JP) .................................. 2019-131585

(51) Int. Cl.
*H04L 12/10* (2006.01)
*B60R 16/023* (2006.01)

(52) U.S. Cl.
CPC ...... *B60R 16/0231* (2013.01); *B60R 16/0238* (2013.01); *H04L 12/10* (2013.01)

(58) Field of Classification Search
CPC .............. H04L 12/10; H04L 12/40045; H04L 2012/40273; B60R 16/02–06
See application file for complete search history.

(56) References Cited

U.S. PATENT DOCUMENTS 9,377,794 B1 * 6/2016 Dwelley ................. G05F 1/462
2011/0077793 A1  3/2011 Hsieh et al.
(Continued)

FOREIGN PATENT DOCUMENTS

| JP | 2004-200933 A | 7/2004 |
| JP | 2015-067187 A | 4/2015 |
| JP | 2017-191610 A | 10/2017 |

OTHER PUBLICATIONS

VES30-8S, 8+1 Gigabit Ethernet Switch with 8-Port PoE, data sheet, NEXCOM, Apr. 17, 2017, [retrieved on Jun. 19, 2020], Internet:<https://www.nexcom-jp.com/Products/mobile-computing-solutions/in-vehicle-poe-switch/poe-switch/in-vehicle-poe-switch-ves30-8s>.

NXP Automotive, Automotive Ethernet Congress (Germany), "Automotive Ethernet-Enabler for Autonomous Driving", Feb. 4, 2016.

*Primary Examiner* — Daniel Cavallari
*Assistant Examiner* — David A Shiao
(74) *Attorney, Agent, or Firm* — Oliff PLC

(57) ABSTRACT

An in-vehicle communication system includes a first switching device and a second switching device each configured to relay, via a transmission path, information between a plurality of function units mounted to a vehicle. Upon being supplied with a power source voltage via a power-source-
(Continued)

dedicated line from a power source device mounted to the vehicle, the first switching device supplies a power source voltage via the transmission path to one or a plurality of the function units and the second switching device that are connected to the first switching device, and the second switching device extracts a power source voltage from the transmission path, and supplies a power source voltage via the transmission path to one or a plurality of the function units that are connected to the second switching device.

5 Claims, 11 Drawing Sheets

(56) References Cited

U.S. PATENT DOCUMENTS

| | | | |
|---|---|---|---|
| 2012/0110356 A1* | 5/2012 | Yousefi | H04N 19/102 |
| | | | 713/320 |
| 2012/0173900 A1 | 7/2012 | Diab et al. | |
| 2013/0229054 A1* | 9/2013 | Doring | H04L 12/40045 |
| | | | 307/10.1 |
| 2017/0302462 A1 | 10/2017 | Yun et al. | |
| 2019/0222437 A1* | 7/2019 | Iwata | H04L 12/10 |
| 2021/0325868 A1* | 10/2021 | Allgaier | H04L 12/40091 |

* cited by examiner

ONBOARD COMMUNICATION SYSTEM, SWITCHING DEVICE, AND CONTROL METHOD

TECHNICAL FIELD

The present disclosure relates to an in-vehicle communication system, a switching device, and a control method.

This application claims priority on Japanese Patent Application No. 2019-131585 filed on Jul. 17, 2019, the entire content of which is incorporated herein by reference.

BACKGROUND ART

For example, Japanese Laid-Open Patent Publication No. 2015-067187 (PATENT LITERATURE 1) discloses a vehicle control system as below. That is, the vehicle control system is for controlling a plurality of function units of a vehicle, and includes: a plurality of function ECUs that are disposed separately in a plurality of regions of the vehicle, that control the plurality of function units, and that are classified into a plurality of groups in accordance with functions of the function units to be controlled; a plurality of relay ECUs respectively disposed in the plurality of regions; a first network that connects the plurality of relay ECUs with each other; and a second network that is provided in each of the plurality of regions, and that connects the function ECU and the relay ECU in each region. Each function ECU, when performing communication with a function ECU that is disposed in a region different from the region where the function ECU is disposed and that is classified in the same group as the function ECU, performs transmission or reception of data via the second network and the relay ECU in the region where the function ECU is disposed, the first network, and the relay ECU and the second network in the region where the function ECU to be communicated with is disposed.

CITATION LIST

Patent Literature

PATENT LITERATURE 1: Japanese Laid-Open Patent Publication No. 2015-067187

Non Patent Literature

NON PATENT LITERATURE: NXP AUTOMOTIVE, Automotive Ethernet Congress (Germany), "AUTOMOTIVE ETHERNET-ENABLER FOR AUTONOMOUS DRIVING", Feb. 4, 2016

SUMMARY OF INVENTION (1) An in-vehicle communication system of the present disclosure includes: a first switching device and a second switching device each configured to relay, via a transmission path, information between a plurality of function units mounted to a vehicle. Upon being supplied with a power source voltage via a power-source-dedicated line from a power source device mounted to the vehicle, the first switching device supplies a power source voltage via the transmission path to one or a plurality of the function units and the second switching device that are connected to the first switching device, and the second switching device extracts a power source voltage from the transmission path, and supplies a power source voltage via the transmission path to one or a plurality of the function units that are connected to the second switching device.

(4) A switching device of the present disclosure includes: a switching unit configured to relay, via a transmission path, information between a plurality of function units mounted to a vehicle; a power source receiving and supplying circuit configured to extract a power source voltage from the transmission path; and a power source supply circuit configured to supply, via the transmission path, the power source voltage extracted by the power source receiving and supplying circuit or a voltage based on the power source voltage, to one or a plurality of the function units that are connected to the switching device.

(5) A control method of the present disclosure is to be performed in an in-vehicle communication system including a first switching device and a second switching device each configured to relay, via a transmission path, information between a plurality of function units mounted to a vehicle. The control method includes: a step, performed by the first switching device upon being supplied with a power source voltage via a power-source-dedicated line from a power source device mounted to the vehicle, of supplying a power source voltage via the transmission path to one or a plurality of the function units and the second switching device that are connected to the first switching device; and a step, performed by the second switching device, of extracting a power source voltage from the transmission path and supplying a power source voltage via the transmission path to one or a plurality of the function units that are connected to the second switching device.

(6) A control method of the present disclosure is to be performed in a switching device configured to relay, via a transmission path, information between a plurality of function units mounted to a vehicle. The control method includes: a step of extracting a power source voltage from the transmission path; and a step of supplying, via the transmission path, the extracted power source voltage or a voltage based on the power source voltage, to one or a plurality of the function units that are connected to the switching device.

One mode of the present disclosure can be realized not only as an in-vehicle communication system that includes such a characteristic processing unit, but also as a program for causing a computer to execute such characteristic process steps. One mode of the present disclosure can be realized as a semiconductor integrated circuit that realizes a part or the entirety of the in-vehicle communication system.

One mode of the present disclosure can be realized not only as a switching device that includes such a characteristic processing unit, but also as a program for causing a computer to execute such characteristic process steps. One mode of the present disclosure can be realized as a semiconductor integrated circuit that realizes a part or the entirety of the switching device.

DESCRIPTION OF EMBODIMENTS

Figure 1:
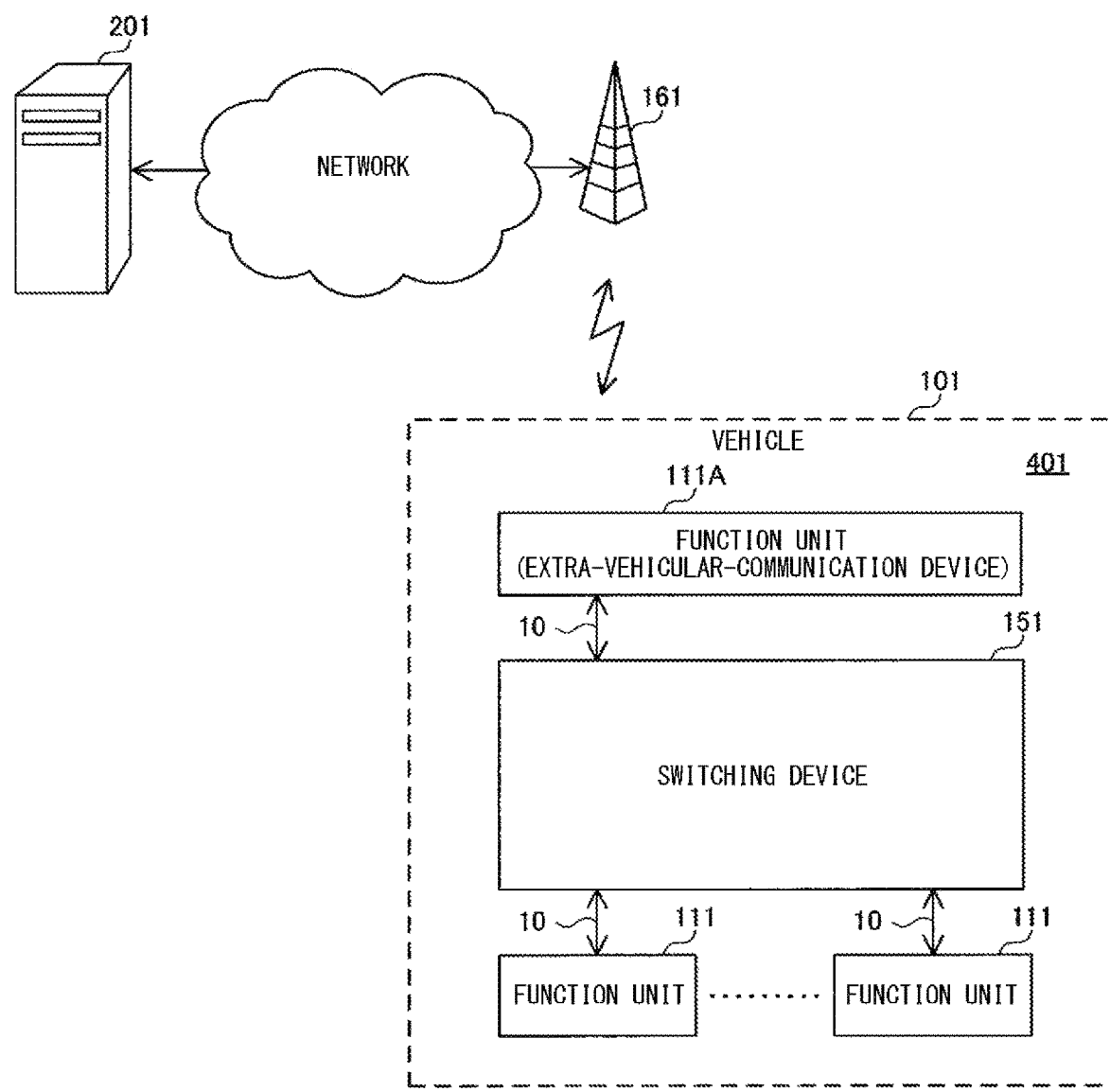
FIG. 1 shows a configuration of an in-vehicle communication system according to a first embodiment of the present disclosure.

Problems to be Solved by the Present Disclosure

For example, in the in-vehicle network as described above, when a large number of function units are provided in the vehicle, wires and the like between function units are increased in association with increase of the function units. As a result, the total length of the transmission lines in the in-vehicle network is increased.

The present disclosure has been made in order to solve the above problem. An object of the present disclosure is to provide an in-vehicle communication system, a switching device, and a control method that are capable of realizing an in-vehicle network having a simpler configuration in which wires are effectively reduced.

Effects of the Present Disclosure

According to the present disclosure, an in-vehicle network having a simpler configuration in which wires are effectively reduced can be realized.

DESCRIPTION OF EMBODIMENT OF THE PRESENT DISCLOSURE

First, contents of embodiments of the present disclosure are listed and described.

(1) An in-vehicle communication system according to an embodiment of the present disclosure includes: a first switching device and a second switching device each configured to relay, via a transmission path, information between a plurality of function units mounted to a vehicle. Upon being supplied with a power source voltage via a power-source-dedicated line from a power source device mounted to the vehicle, the first switching device supplies a power source voltage via the transmission path to one or a plurality of the function units and the second switching device that are connected to the first switching device, and the second switching device extracts a power source voltage from the transmission path, and supplies a power source voltage via the transmission path to one or a plurality of the function units that are connected to the second switching device.

With this configuration, for example, the switching devices can be disposed at separate places in the vehicle. Thus, in a case where the disposition locations of the respective function units are distributed in the vehicle, increase in the total length of transmission lines for communication in the in-vehicle network can be suppressed. With the configuration in which a power source voltage is supplied to the first switching device via a power-source dedicated line, and a power source voltage is distributed from the first switching device to each function unit via a transmission line for communication, the length of wires for communication can be reduced, and further, the wires for power source in the in-vehicle network can be reduced. With the configuration in which a power source voltage is supplied from the first switching device via a transmission line for communication to the second switching device and the power source voltage is distributed from the second switching device to each function unit, the wires for power source in the in-vehicle network can be further reduced. Therefore, an in-vehicle network having a simpler configuration in which wires are effectively reduced can be realized.

(2) Preferably, at least one of the first switching device and the second switching device is capable of switching whether or not to supply a power source voltage, for each of the function units connected thereto.

With this configuration, control of power source supply to each function unit can be concentrated in the switching device, and thus, the control system in the in-vehicle network can be simplified.

(3) More preferably, when a new function unit serving as a function unit that is new has been connected to the second switching device, the second switching device transmits, to the first switching device, authentication information received from the new function unit; receives, from the first switching device, power source control information indicating whether or not to supply a power source voltage to the new function unit; and switches whether or not to supply a power source voltage to the new function unit, in accordance with the received power source control information.

With this configuration, the configurations for authentication regarding a new function unit and power source supply control can be simplified while the in-vehicle network is allowed to be expandable.

(4) A switching device according to an embodiment of the present disclosure includes: a switching unit configured to relay, via a transmission path, information between a plurality of function units mounted to a vehicle; a power source receiving and supplying circuit configured to extract a power source voltage from the transmission path; and a power source supply circuit configured to supply, via the transmission path, the power source voltage extracted by the power source receiving and supplying circuit or a voltage based on the power source voltage, to one or a plurality of the function units that are connected to the switching device.

As described above, with the configuration in which the power source voltage is distributed via a transmission line for communication to each of the function units and the switching device, the length of wires for communication can be reduced, and further, the wires for power source in the in-vehicle network can be reduced. Therefore, an in-vehicle network having a simpler configuration in which wires are effectively reduced can be realized.

(5) A control method according to an embodiment of the present disclosure is to be performed in an in-vehicle communication system including a first switching device and a second switching device each configured to relay, via a transmission path, information between a plurality of function units mounted to a vehicle. The control method includes: a step, performed by the first switching device upon being supplied with a power source voltage via a power-source-dedicated line from a power source device mounted to the vehicle, of supplying a power source voltage via the transmission path to one or a plurality of the function units and the second switching device that are connected to the first switching device; and a step, performed by the second switching device, of extracting a power source voltage from the transmission path and supplying a power source voltage via the transmission path to one or a plurality of the function units that are connected to the second switching device.

With this configuration, for example, the switching devices can be disposed at separate places in the vehicle. Thus, in a case where the disposition locations of the respective function units are distributed in the vehicle, increase in the total length of transmission lines for communication in the in-vehicle network can be suppressed. With the configuration in which a power source voltage is supplied to the first switching device via a power-source dedicated line, and a power source voltage is distributed from the first switching device to each function unit via a transmission line for communication, the length of wires for communication can be reduced, and further, the wires for power source in the in-vehicle network can be reduced. With the configuration in which a power source voltage is supplied from the first switching device via a transmission line for communication to the second switching device and the power source voltage is distributed from the second switching device to each function unit, the wires for power source in the in-vehicle network can be further reduced. Therefore, an in-vehicle network having a simpler configuration in which wires are effectively reduced can be realized.

(6) A control method according to an embodiment of the present disclosure is to be performed in a switching device configured to relay, via a transmission path, information between a plurality of function units mounted to a vehicle. The control method includes: a step of extracting a power source voltage from the transmission path; and a step of supplying, via the transmission path, the extracted power source voltage or a voltage based on the power source voltage, to one or a plurality of the function units that are connected to the switching device.

As described above, with the configuration in which the power source voltage is distributed via a transmission line for communication to each of the function units and the switching device, the length of wires for communication can be reduced, and further, the wires for power source in the in-vehicle network can be reduced. Therefore, an in-vehicle network having a simpler configuration in which wires are effectively reduced can be realized.

Hereinafter, an embodiment of the present disclosure will be described with reference to the drawings. In the drawings, the same or corresponding parts are denoted by the same reference signs, and description thereof is not repeated. At least some of embodiments described below may be combined as desired.

First Embodiment

[Configuration and Basic Operation]

FIG. 1 shows a configuration of an in-vehicle communication system according to a first embodiment of the present disclosure.

With reference to FIG. 1, an in-vehicle communication system 401 includes a switching device 151.

The in-vehicle communication system 401 is mounted to a vehicle 101. The vehicle 101 is provided with a plurality of function units 111.

The switching device 151 is, for example, an in-vehicle ECU (Electronic Control Unit) provided on the front side of the vehicle 101, and relays information between a plurality of function units 111 via an Ethernet (registered trademark) cable 10 or the like. More specifically, the switching device 151 is connected to a plurality of function units 111 via Ethernet cables 10 or the like, and can perform communication with the plurality of function units 111. Between the switching device 151 and each function unit 111, information is communicated by use of an Ethernet frame, for example.

An extra-vehicular-communication device 111A is a function unit 111, and can communicate with an external device positioned outside the vehicle 101.

Specifically, for example, an extra-vehicular-communication device 111A is a TCU (Telematics Communication Unit), and can perform wireless communication with an external device 201 such as a server via a wireless base station device 161 or the like in accordance with a communication standard such as LTE (Long Term Evolution) or 3G.

Comparative Example 1

Figure 2:
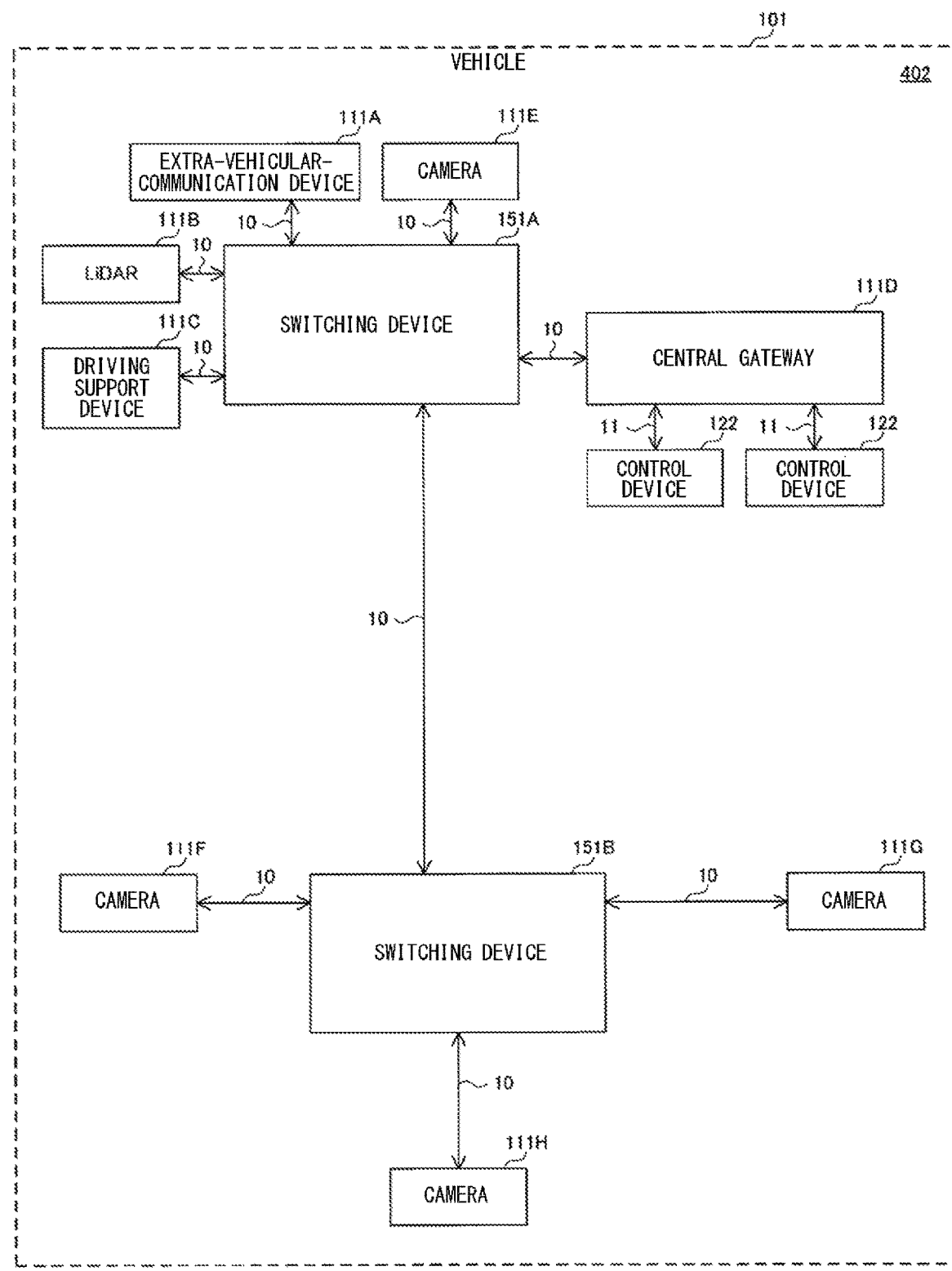
FIG. 2 shows Comparative Example 1 of the in-vehicle communication system according to the first embodiment of the present disclosure.

FIG. 2 shows Comparative Example 1 of the in-vehicle communication system according to the first embodiment of the present disclosure. Comparative Example 1 is a comparative example for an in-vehicle communication system shown in FIG. 3 described later.

With reference to FIG. 2, the in-vehicle communication system 402 includes two switching devices 151A, 151B, which are each a switching device 151. The switching device 151A is, for example, connected via Ethernet cables 10 to the switching device 151B, the extra-vehicular-communication device 111A, a LiDAR (Light Detection and Ranging) 111B, a driving support device 111C, a central gateway 111D, and a camera 111E. For example, the switching device 151B is connected to cameras 111F, 111G, 111H via Ethernet cables 10. Hereinafter, each of the switching devices 151A, 151B will also be referred to as a switching device 151.

Here, the LiDAR 111B, the driving support device 111C, the central gateway 111D, and the cameras 111E, 111F, 111G, 111H are examples of the function unit 111. The LiDAR 111B and the cameras 111E, 111F, 111G, 111H are examples of sensors. In the in-vehicle communication system 402, not limited to the LiDAR and cameras, other types of sensors such as a millimeter wave sensor, may be provided.

A configuration in which sensors, such as LiDAR and cameras, and in-vehicle ECUs having a switch function for relaying information between a plurality of function units are connected to each other is disclosed in NXP AUTOMOTIVE, Automotive Ethernet Congress (Germany), "AUTOMOTIVE ETHERNET-ENABLER FOR AUTONOMOUS DRIVING", Feb. 4, 2016 (NON PATENT LITERATURE 1), for example.

The switching device 151A, the extra-vehicular-communication device 111A, the LiDAR 111B, the driving support device 111C, the central gateway 111D, and the camera 111E are provided on the front side of the vehicle 101, for example. The switching device 151B and the cameras 111E, 111F, 111G are provided on the rear side of the vehicle 101, for example.

The central gateway 111D is connected to each control device 122 via a CAN bus 11 according to a CAN (Controller Area Network) (registered trademark) standard, for example.

For example, the central gateway 111D performs a relay process of information between the control devices 122 respectively connected to different CAN buses 11, and performs a relay process of information between the switching device 151A and a control device 122.

For example, the LiDAR 111B includes: a laser device for applying laser light; a light receiving element for receiving scattered light of laser light by an object; a processing circuit and a CPU (Central Processing unit) having installed therein corresponding software; and the like.

The cameras 111E, 111F, 111G, 111H each include: an imaging element for capturing an image of the surroundings of the vehicle 101; a processing circuit and a CPU having installed therein corresponding software; and the like.

The switching device 151 performs a relay process of relaying data between function units 111 in the in-vehicle communication system 402. That is, the switching device 151 transmits an Ethernet frame received from a function unit 111, to another function unit 111 or another switching device 151 in accordance with the destination of the Ethernet frame.

More specifically, each function unit 111 and each switching device 151 belong to one or a plurality of VLANs (Virtual Local Area Networks) in the in-vehicle communication system 402, for example.

Each switching device 151 and each function unit 111 have a unique MAC (Media Access Control) address and a unique IP (Internet Protocol) address.

For example, the switching devices 151A, 151B can perform a relay process in accordance with a layer 2 and a layer 3 at a higher order than the layer 2.

More specifically, in the in-vehicle communication system 402, for example, information is transmitted/received by use of an IP packet in accordance with an IP protocol. The IP packet is stored in an Ethernet frame and transmitted.

Specifically, the switching device 151A, 151B operates in accordance with a communication protocol having a plurality of layers. More specifically, a switching device 151 can function as an L2 (layer 2) switch, and relays an Ethernet frame transmitted between function units 111 that belong to the same VLAN, and an Ethernet frame transmitted between the other switching device 151 and a function unit 111.

The switching device 151A, 151B can also function as an L3 (layer 3) switch, and relays an Ethernet frame transmitted between function units 111 that belong to different VLANs, and an Ethernet frame transmitted between the other switching device 151 and a function unit 111.

Thus, with the configuration in which even in the vehicle 101 where wires such as Ethernet cables 10 connecting function units 111 are increased because the disposition locations of the function units 111 are distributed in the vehicle 101, the plurality of switching devices 151 are disposed at separate places in the vehicle 101, and increase in the total length of the Ethernet cables 10 in the in-vehicle communication system 402 can be suppressed.

Comparative Example 2

Figure 3:
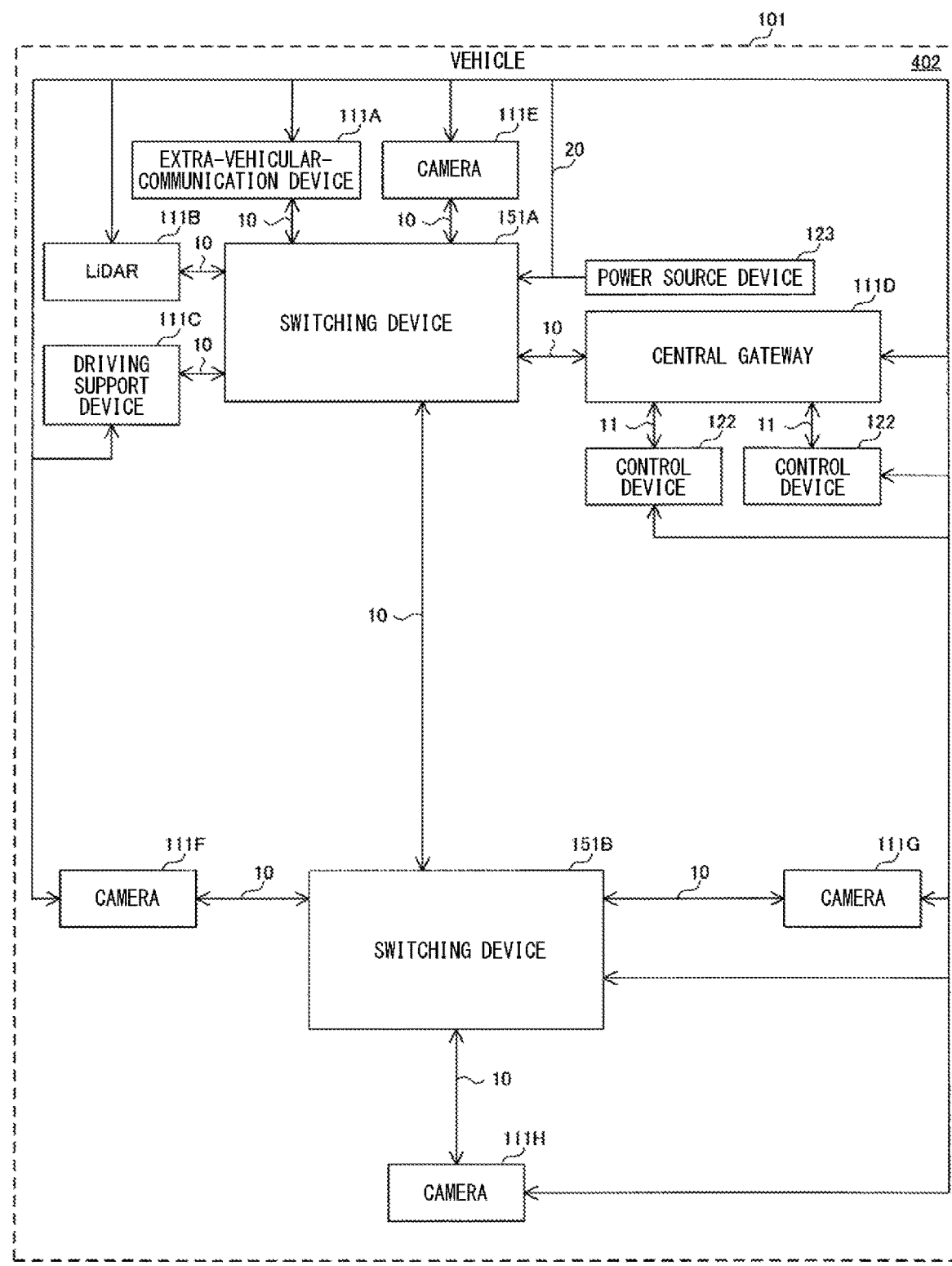
FIG. 3 shows Comparative Example 2 of the in-vehicle communication system according to the first embodiment of the present disclosure.

FIG. 3 shows Comparative Example 2 of the in-vehicle communication system according to the first embodiment of the present disclosure. Comparative Example 2 is a comparative example for the in-vehicle communication system according to the embodiment of the present disclosure shown in later-described FIG. 4 and thereafter.

With reference to FIG. 3, in the vehicle 101 having the in-vehicle communication system 402 mounted thereto, the switching devices 151A, 151B, the extra-vehicular-communication device 111A, the LiDAR (Light Detection and Ranging) 111B, the driving support device 111C, the central gateway 111D, and the cameras 111E, 111F, 111G, 111H are connected to a power source device 123 by a dedicated line 20 for power source, for example, and are supplied with a power source voltage via the dedicated line 20 from the power source device 123.

In order to simplify the drawing, in FIG. 3, each function unit 111 and each switching device 151 are supplied with a power source voltage via a common dedicated line 20. However, the present disclosure is not limited thereto. Each function unit 111 and each switching device 151 may be supplied with the power source voltage via separate dedicated lines 20.

[Problem]

In Comparative Example 2, each function unit provided in the vehicle needs a wire such as a cable for supplying the power source voltage, separately from the Ethernet cable. Therefore, the total length of cables i.e., Ethernet cables and the aforementioned cables, is further increased.

In contrast to this, in the in-vehicle communication system according to the embodiment of the present disclosure, the above problem is solved by the configurations and operations as described below. The contents other than the contents described below are the same as those in the in-vehicle communication systems 401, 402.

Figure 4:
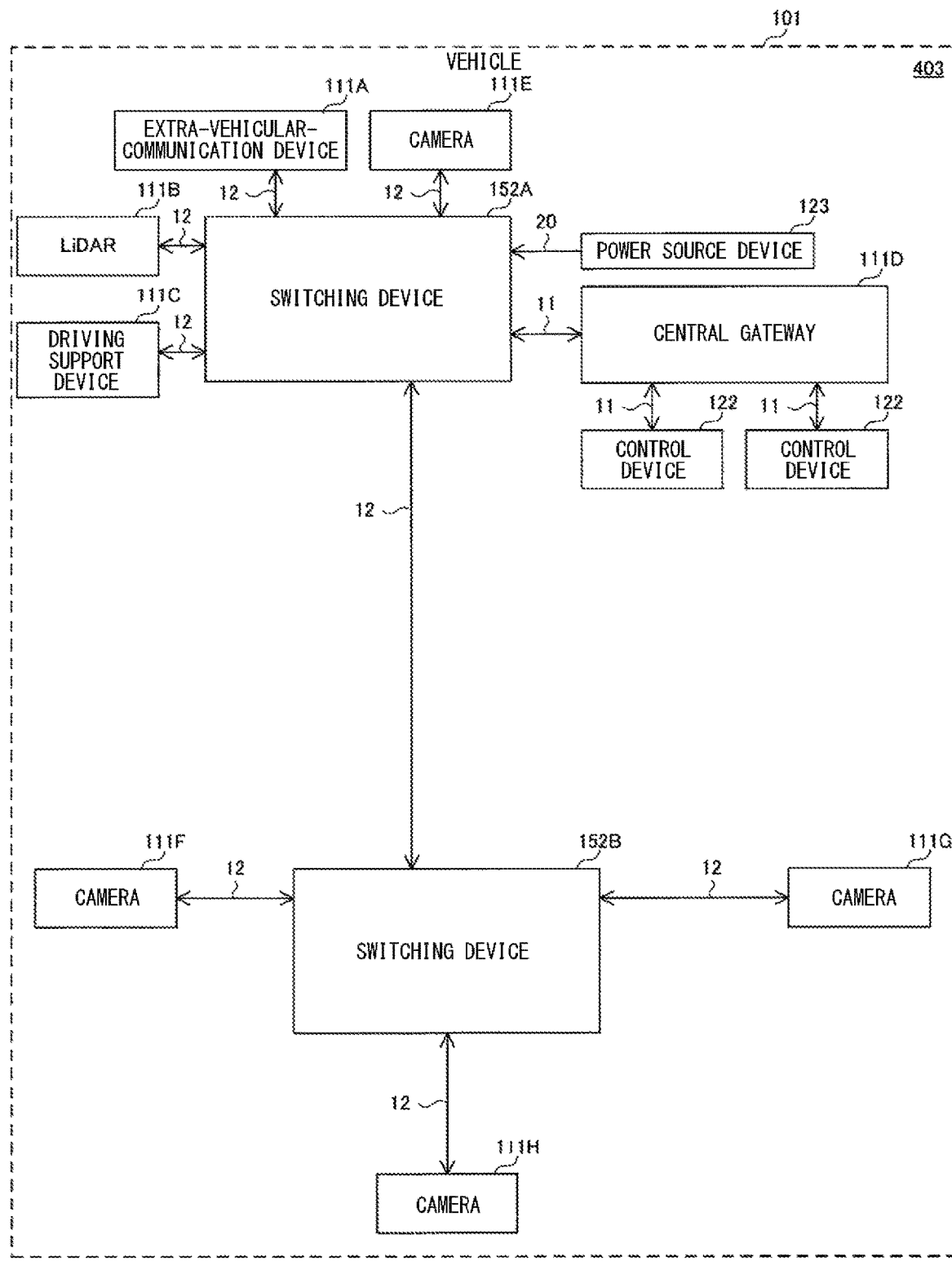
FIG. 4 shows an example of a configuration of the in-vehicle communication system according to the first embodiment of the present disclosure.

FIG. 4 shows an example of a configuration of the in-vehicle communication system according to the first embodiment of the present disclosure.

With reference to FIG. 4, an in-vehicle communication system 403 includes a switching device 152A and a switching device 152B. Hereinafter, each of the switching devices 152A, 152B will also be referred to as a switching device 152. The switching device 152 is an example of the function unit 111.

The switching device 152A is provided on the front side of the vehicle 101, for example, and is connected to each of the extra-vehicular-communication device 111A, the LiDAR (Light Detection and Ranging) 111B, the driving support device 111C, the central gateway 111D, the camera 111E, and the switching device 152B, by a transmission path such as an Ethernet cable (hereinafter, also referred to as a POE cable) 12 that corresponds to a POE (Power Over Ethernet (registered trademark)) according to the IEEE 802.3af standard.

The switching device 152A is connected to the power source device 123 by a dedicated line 20 for power source, for example, and is supplied with a power source voltage via the dedicated line 20 from the power source device 123.

The switching device 152B is provided on the rear side of the vehicle 101, for example, and is connected to each of the cameras 111F, 111G, 111H by a transmission path such as a POE cable 12. That is, the switching device 152A and the switching device 152B are disposed separately on the front side and the rear side of the vehicle 101.

In the in-vehicle communication system 403, the POE cable 12 may be an Ethernet cable that corresponds to PoDL (Power over Datalines) according to the IEEE 802.3bu standard and is used in in-vehicle networks.

[Switch Device]

Figure 5:
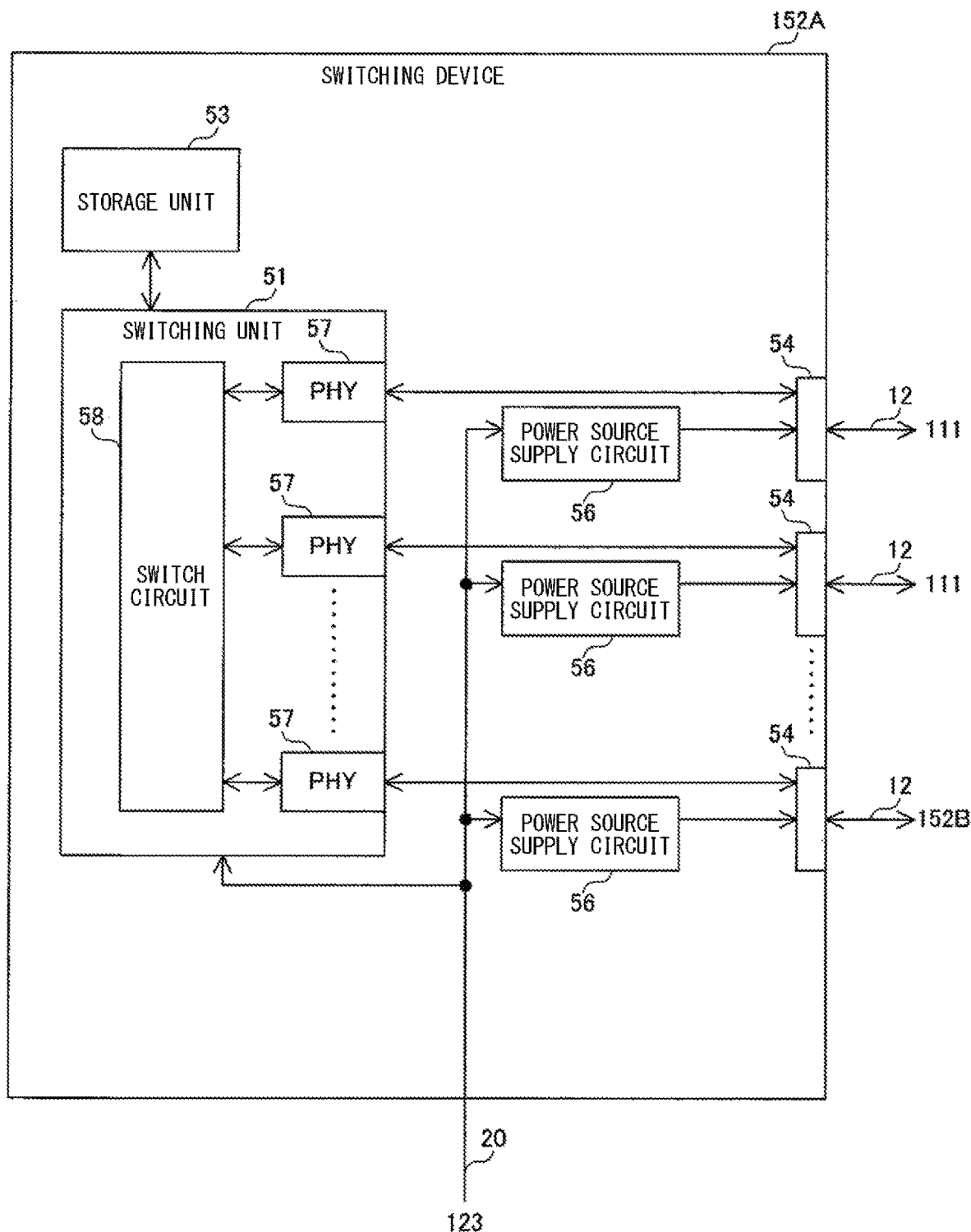
FIG. 5 shows an example of a configuration of a switching device according to the first embodiment of the present disclosure.

FIG. 5 shows an example of a configuration of the switching device according to the first embodiment of the present disclosure. FIG. 5 shows a configuration of the switching device 152A.

With reference to FIG. 5, the switching device 152A includes a switching unit 51, a storage unit 53, a plurality of communication ports 54, and a plurality of power source supply circuits 56. The switching unit 51 includes: one or a plurality of interface circuits 57 that each perform physical layer (PHY) processing; and a switch circuit 58. It should be noted a single communication port 54 and a single power source supply circuit 56 may be provided.

The switching unit 51 and each power source supply circuit 56 in the switching device 152A are connected to the power source device 123, for example. More specifically, the switching unit 51 and each power source supply circuit 56 are connected to the power source device 123 via the dedicated line 20, and are supplied with a power source voltage via the dedicated line 20 from the power source device 123. The switching unit 51 operates in accordance with the power source voltage.

[Relay Process]

Each communication port 54 in the switching device 152A is a terminal to which a POE cable 12 can be connected, for example. The communication port 54 may be a terminal of an integrated circuit.

Each of the plurality of communication ports 54 is connected to the switching device 152B or one of the plurality of function units 111 via a POE cable 12. Each of the plurality of communication ports 54 is associated with a VLAN, for example.

The switching unit 51 performs a relay process of relaying, via a POE cable 12, information between a plurality of function units 111. The storage unit 53 retains information to be relayed.

More specifically, for example, the switching unit 51 operates as an L2 switch, and relays an Ethernet frame between function units 111 that belong to the same VLAN.

Specifically, when an interface circuit 57 in the switching unit 51 has received a signal via a corresponding communication port 54 from a function unit 111, the interface circuit 57 subjects the received signal to A/D (Analog-to-Digital) conversion, for example, to acquire an Ethernet frame. Then, the interface circuit 57 outputs the acquired Ethernet frame to the switch circuit 58.

The switch circuit 58 stores the Ethernet frame received from the interface circuit 57 into the storage unit 53, and confirms the destination MAC address of the Ethernet frame. Then, for example, with reference to an address table stored in the storage unit 53, the switch circuit 58 specifies a communication port 54 that corresponds to the confirmed destination MAC address. The address table indicates a correspondence relationship between the port number of a communication port 54, and a VLAN ID and the MAC address of a connection destination device.

Then, the switch circuit 58 acquires the Ethernet frame from the storage unit 53, and outputs the acquired Ethernet frame to an interface circuit 57 that corresponds to the specified communication port 54.

The interface circuit 57 subjects the Ethernet frame received from the switch circuit 58 to D/A (Digital-to-Analog) conversion, and transmits, via the communication port 54 and a POE cable 12, the converted signal to the function unit 111 indicated by the destination MAC address of the Ethernet frame.

In addition, the switching unit 51 operates as an L3 switch, for example, and relays communication data between function units 111 that belong to different VLANs.

Specifically, the switch circuit 58 in the switching unit 51 confirms that the destination MAC address of an Ethernet frame received from an interface circuit 57 is the MAC address of the switch circuit 58, and takes out an IP packet from the Ethernet frame.

For example, with reference to a network table stored in the storage unit 53, the switch circuit 58 specifies the ID of the VLAN that corresponds to the destination IP address included in the IP packet. The network table indicates a correspondence relationship between a VLAN ID and a network address.

Further, with reference to an ARP (Address Resolution Protocol) table stored in the storage unit 53, the switch circuit 58 acquires a MAC address of a function unit, e.g., the switching device 152B, that corresponds to the gateway of the VLAN that corresponds to the specified ID. The ARP table indicates, for each VLAN ID, a correspondence relationship between an IP address and a MAC address.

Then, the switch circuit 58 creates an Ethernet frame that includes the acquired MAC address as the destination MAC address and that includes the IP packet, and stores the Ethernet frame into the storage unit 53.

With reference to the above address table, the switch circuit 58 specifies a communication port 54 that corresponds to the destination MAC address.

Then, the switch circuit 58 acquires the Ethernet frame from the storage unit 53 and outputs the acquired Ethernet frame to an interface circuit 57 that corresponds to the specified communication port 54.

The interface circuit 57 transmits, via the communication port 54 and a POE cable 12, a signal obtained by subjecting the Ethernet frame received from the switch circuit 58 to D/A (Digital-to-Analog) conversion, to the function unit 111, e.g., the switching device 152B, indicated by the destination MAC address of the Ethernet frame.

The switching unit 51 need not necessarily be configured to relay information between a plurality of function units 111 via a POE cable 12, but may be configured to relay information between the other switching device 152 and a function unit 111 via a POE cable 12. More specifically, the switching unit 51 in the switching device 152A may relay information between the switching device 152B and a function unit 111 via a POE cable 12.

[Supply of Power Source Voltage]

The switching device 152A supplies, via a POE cable 12, a power source voltage to each of one or a plurality of function units 111 and the switching device 152B that are connected to the switching device 152A.

Specifically, the power source supply circuit 56 in the switching device 152A supplies, via a POE cable 12, a power source voltage received via the dedicated line 20 from the power source device 123, to one or a plurality of function units 111 connected to the switching device 152A.

More specifically, one or a plurality of power source supply circuits 56 in the switching device 152A output the power source voltage received via the dedicated line 20 from the power source device 123, to corresponding communication ports 54.

Accordingly, the power source voltage supplied from the power source supply circuits 56 is supplied, via POE cables 12 connected to the respective communication ports 54, to the function units 111 and the switching device 152B.

Specifically, with reference to FIG. 3 again, each power source supply circuit 56 in the switching device 152A supplies, via a POE cable 12, the power source voltage to each of the extra-vehicular-communication device 111A, the LiDAR 111B, the driving support device 111C, the central gateway 111D, the camera 111E, and the switching device 152B.

The power source supply circuit 56 may be configured to supply a voltage based on the power source voltage. More specifically, the power source supply circuit 56 may be configured to output, to a corresponding communication port 54, a power source voltage obtained by boosting or stepping-down the power source voltage received via the dedicated line 20 from the power source device 123.

In this manner, in the POE cable 12 in the in-vehicle communication system 403, a signal obtained through D/A conversion of an Ethernet frame by the interface circuit 57 is superimposed on the power source voltage supplied by the power source supply circuit 56, and is transmitted.

In the in-vehicle communication system 403, due to the configuration in which a plurality of switching devices 152 are disposed at separate places in the vehicle 101, in a case where the disposition locations of the respective function units 111 are distributed in the vehicle 101, increase in the total length of the POE cables 12 in the in-vehicle communication system 403 can be suppressed.

With the configuration in which the power source voltage is distributed from the switching device 152A to each function unit 111 and the switching device 152B via the POE cables 12, the dedicated line 20 that connects the switching device 152B and each function unit 111 to the power source device 123 is not necessary. Therefore, wires in the in-vehicle communication system can be further reduced.

Figure 6:
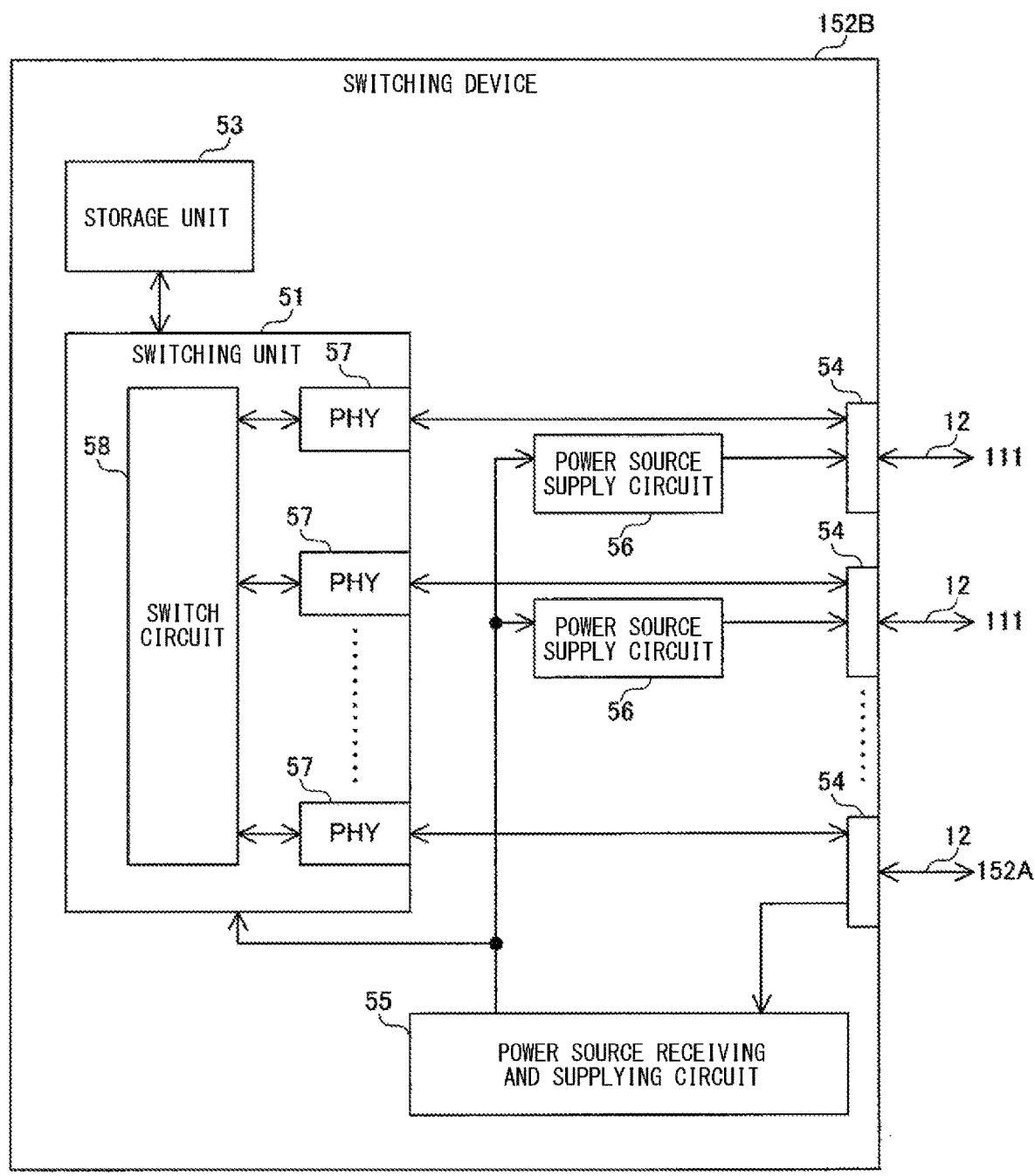
FIG. 6 shows another example of the configuration of the switching device according to the first embodiment of the present disclosure.

FIG. 6 shows another example of the configuration of the switching device according to the first embodiment of the present disclosure. FIG. 6 shows a configuration of the switching device 152B.

With reference to FIG. 6, when compared with the switching device 152A shown in FIG. 5, the switching device 152B further includes a power source receiving and supplying circuit 55. The switching device 152B includes power source supply circuits 56 by a number that is less, by one, than the number of communication ports 54 of the switching device 152B.

The power source receiving and supplying circuit 55 is connected to the switching unit 51 and each power source supply circuit 56, and is connected to the switching device 152A via one of the plurality of communication ports 54 and a POE cable 12.

The respective power source supply circuits 56 are connected to corresponding function units 111 via the other corresponding communication ports 54 and POE cables 12.

[Acquisition of Power Source Voltage]

The switching device 152B extracts the power source voltage from a POE cable 12. More specifically, the power source receiving and supplying circuit 55 in the switching device 152B extracts the power source voltage from a POE cable 12.

Specifically, for example, the power source receiving and supplying circuit 55 extracts, by using a filter (not shown), the power source voltage transmitted via a POE cable 12 and a communication port 54 from the switching device 152A.

Then, the power source receiving and supplying circuit 55 outputs the extracted power source voltage to the switching unit 51 and each power source supply circuit 56. The power source receiving and supplying circuit 55 may be configured to output, to the switching unit 51 and each power source supply circuit 56, a power source voltage obtained by boosting or stepping-down the power source voltage received from the switching device 152A via a POE cable 12 and a communication port 54.

For example, the switching unit 51 operates in accordance with the power source voltage received from the power source receiving and supplying circuit 55. Then, for example, the switching unit 51 performs the above relay process similar to that performed in the switching device 152A. More specifically, the switching unit 51 in the switching device 152B relays, via POE cables 12, information between a plurality of function units 111, and information between the switching device 152A and a function unit 111.

With reference to FIG. 4 again, the switching device 152B supplies, via a POE cable 12, the power source voltage to each of one or a plurality of function units 111 connected to the switching device 152B.

More specifically, with reference to FIG. 6 again, the power source supply circuit 56 in the switching device 152B supplies, via a POE cable 12, the power source voltage extracted by the power source receiving and supplying circuit 55, to one or a plurality of function units 111 connected to the switching device 152B.

More specifically, one or a plurality of power source supply circuits 56 in the switching device 152B output the power source voltage supplied by the power source receiving and supplying circuit 55, to corresponding communication ports 54.

Accordingly, the power source voltage supplied from the power source supply circuits 56 is supplied, via POE cables 12 connected to the respective communication ports 54, to corresponding function units 111.

The power source supply circuit 56 may be configured to supply a voltage based on the above power source voltage. More specifically, the power source supply circuit 56 may be configured to output, to a corresponding communication port 54, a power source voltage obtained by boosting or stepping-down the power source voltage supplied from the power source receiving and supplying circuit 55.

[Operation Flow]

Each device in the in-vehicle communication system according to the embodiment of the present disclosure includes a computer that includes a memory. An arithmetic processing unit such as a CPU in the computer reads out, from the memory, a program including a part or all of steps in the sequence diagram or flow chart described below, and executes the program. Programs of the plurality of devices can each be installed from outside. The programs of the plurality of devices are each distributed in a state of being stored in a storage medium.

Figure 7:
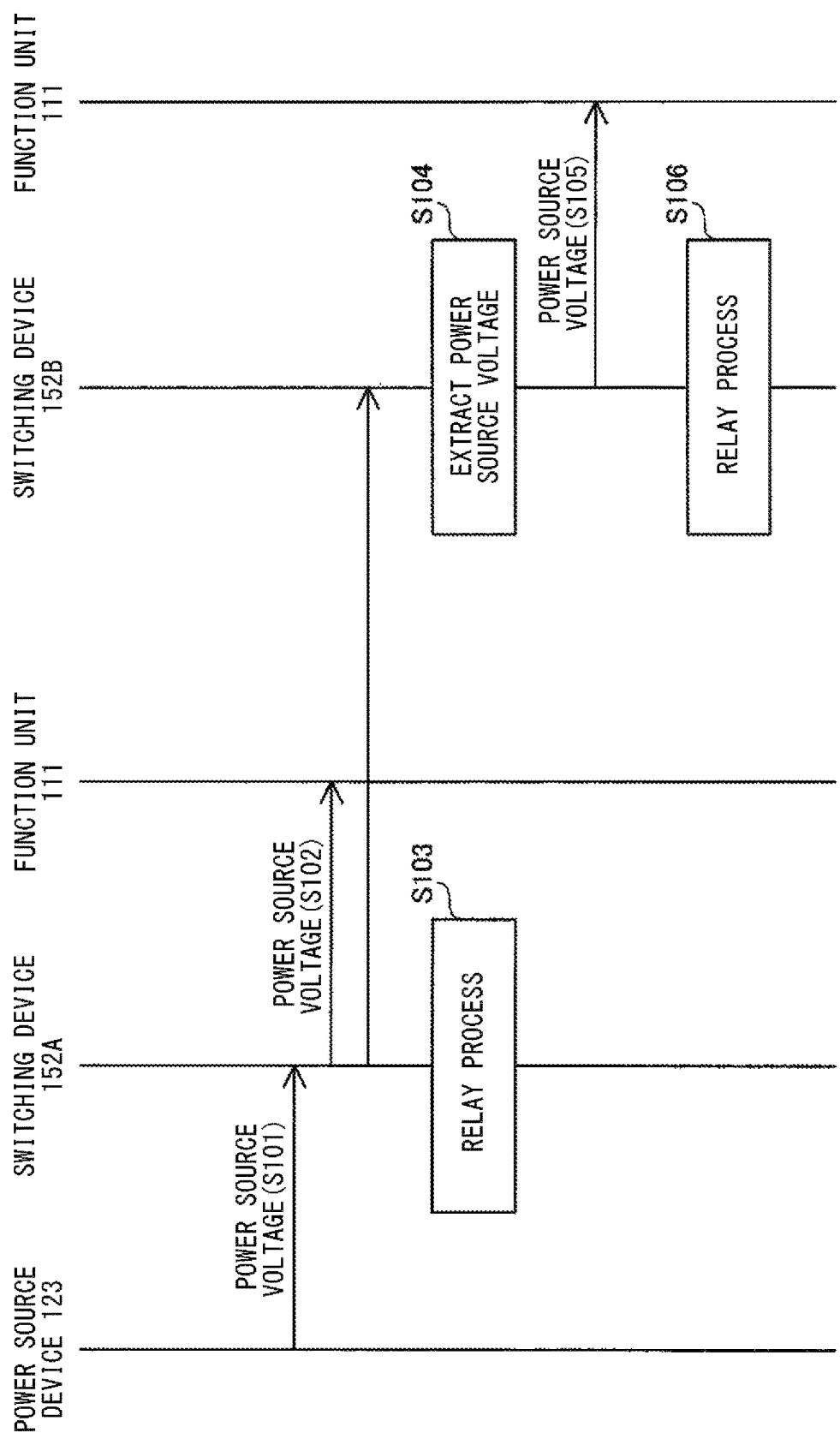
FIG. 7 shows an example of a sequence of supply of a power source voltage and a relay process performed in the in-vehicle communication system according to the first embodiment of the present disclosure.

FIG. 7 shows an example of a sequence of supply of a power source voltage and a relay process performed in the in-vehicle communication system according to the first embodiment of the present disclosure.

With reference to FIG. 7, first, upon being supplied with a power source voltage via the dedicated line 20 from the power source device 123, for example, the switching device 152A starts operation (step S101).

Next, the switching device 152A supplies the power source voltage via a POE cable 12 to each of one or a plurality of function units 111 and the switching device 152B that are connected to the switching device 152A (step S102).

The switching device 152A performs a relay process of relaying, via a POE cable 12, information between a plurality of function units 111 connected to the switching device 152A (step S103).

Next, the switching device 152B extracts the power source voltage from the POE cable 12 and starts operation in accordance with the extracted power source voltage (step S104).

Next, the switching device 152B supplies the power source voltage via a POE cable 12 to each of one or a plurality of function units 111 connected to the switching device 152B (step S105).

Next, the switching device 152B performs a relay process of relaying, via a POE cable 12, information between a plurality of function units 111 connected to the switching device 152B (step S106).

Figure 8:
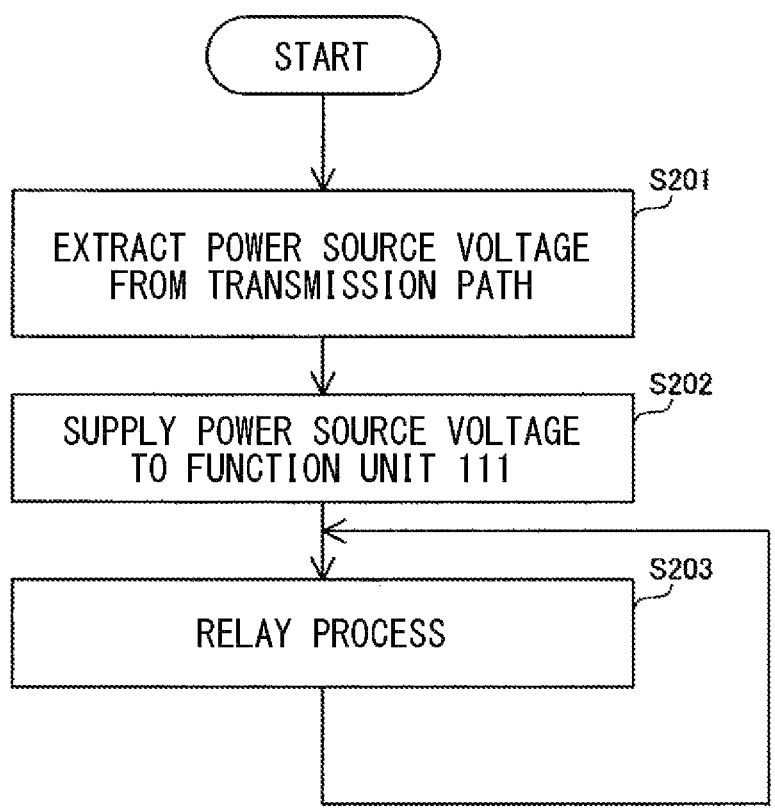
FIG. 8 is a flow chart describing an operation procedure of supply of a power source voltage and a relay process performed in the switching device according to the first embodiment of the present disclosure.

FIG. 8 is a flow chart describing an operation procedure of supply of a power source voltage and a relay process performed in the switching device according to the first embodiment of the present disclosure.

With reference to FIG. 8, first, the switching device 152 starts operation upon being supplied with the power source voltage via the dedicated line 20 from the power source device 123, or starts operation upon extracting the power source voltage from a transmission path such as a POE cable 12, for example (step S201).

Next, the switching device 152 supplies via a POE cable 12 to each of one or a plurality of function units 111 connected to the switching device 152, the power source voltage supplied via the dedicated line 20 from the power source device 123 or the power source voltage extracted from the transmission path such as a POE cable 12, or a power source voltage obtained by boosting or stepping-down the corresponding one of the above power source voltages (step S202).

Next, the switching device 152 performs a relay process of relaying, via a POE cable 12, information between a plurality of function units 111 connected to the switching device 152 (step S203).

In the in-vehicle communication system according to the first embodiment of the present disclosure, the switching device 152A and the switching device 152B each function as an L2 switch or an L3 switch. However, the present disclosure is not limited thereto. In the in-vehicle communication system 403, for example, the switching device 152A may function as an L2 switch or an L3 switch, and the switching device 152B may function as an L2 switch.

In the in-vehicle communication system according to the first embodiment of the present disclosure, the power source receiving and supplying circuit 55 in the switching device 152B is supplied with the power source voltage from the switching device 152A via a POE cable 12 and a communication port 54. However, the present disclosure is not limited thereto. For example, the power source receiving and supplying circuit 55 may be configured to be supplied with the power source voltage from a function unit 111 via a POE cable 12 and a communication port 54.

Meanwhile, in an in-vehicle network, when a large number of function units are provided in a vehicle, wires and the like between function units are increased in association with increase of the function units. As a result, the total length of the transmission lines in the in-vehicle network is increased.

In contrast to this, in the in-vehicle communication system according to the first embodiment of the present disclosure, the switching device 152A and the switching device 152B each relay information between a plurality of function units 111 via a POE cable 12. The switching device 152A is supplied with a power source voltage via the power-source-dedicated line 20 from the power source device 123 mounted to the vehicle 101, and supplies the power source voltage via a POE cable 12 to each of one or a plurality of function units 111 and the switching device 152B that are connected to the switching device 152A. The switching device 152B extracts the power source voltage from the POE cable 12 and supplies the power source voltage via a POE cable 12 to each of one or a plurality of function units 111 connected to the switching device 152B.

With this configuration, for example, the switching devices 152 can be disposed at separate places in the vehicle 101. Therefore, in a case where the disposition locations of the function units 111 are distributed in the vehicle, increase in the total length of the transmission lines for communication in the in-vehicle network can be suppressed. With the configuration in which the power source voltage is supplied via the power-source-dedicated line 20 to the switching device 152A, and the power source voltage is distributed from the switching device 152A to each function unit 111 via a POE cable 12 for communication, the length of wires for communication can be reduced, and further, the wires for power source in the in-vehicle network can be reduced. With the configuration in which the power source voltage is supplied from the switching device 152A via a POE cable 12 to the switching device 152B, and the power source voltage is distributed from the switching device 152B to each function unit 111, the wires for power source in the in-vehicle network can be further reduced.

Therefore, in the in-vehicle communication system according to the first embodiment of the present disclosure, an in-vehicle network having a simpler configuration in which wires are effectively reduced can be realized.

In the switching device according to the first embodiment of the present disclosure, the switching unit 51 relays via a POE cable 12 information between a plurality of function units 111 mounted to the vehicle 101. The power source receiving and supplying circuit 55 extracts a power source voltage from the POE cable 12. The power source supply circuit 56 supplies, via a POE cable 12, the power source voltage extracted by the power source receiving and supplying circuit 55 or a voltage based on the power source voltage, to one or a plurality of function units 111 connected to the switching device 152.

Thus, with the configuration in which the power source voltage is distributed via a POE cable 12 to each of the function units 111 and the switching device 152, the length of wires for communication can be reduced, and further, the wires for power source in the in-vehicle network can be reduced. Therefore, an in-vehicle network having a simpler configuration in which wires are effectively reduced can be realized.

Therefore, in the switching device according to the first embodiment of the present disclosure, an in-vehicle network having a simpler configuration in which wires are effectively reduced can be realized.

In the in-vehicle communication system according to the first embodiment of the present disclosure, the switching device 152A and the switching device 152B each relay, via a POE cable 12, information between a plurality of function units 111. In a control method performed in the in-vehicle communication system according to the first embodiment of the present disclosure, first, upon being supplied with a power source voltage via a power-source-dedicated line 20 from the power source device 123 mounted to the vehicle 101, the switching device 152A supplies the power source voltage via a POE cable 12 to each of one or a plurality of function units 111 and the switching device 152B that are connected to the switching device 152A. Next, the switching device 152B extracts the power source voltage from the POE cable 12 and supplies the power source voltage via a POE cable 12 to each of one or a plurality of function units 111 connected to the switching device 152B.

With this configuration, for example, the switching devices 152 can be disposed at separate places in the vehicle 101. Therefore, in a case where the disposition locations of the function units 111 are distributed in the vehicle, increase in the total length of the transmission lines for communication in the in-vehicle network can be suppressed. With the configuration in which the power source voltage is supplied via the power-source-dedicated line 20 to the switching device 152A, and the power source voltage is distributed from the switching device 152A to each function unit 111 via a POE cable 12 for communication, the length of wires for communication can be reduced, and further, the wires for power source in the in-vehicle network can be reduced. With the configuration in which the power source voltage is supplied from the switching device 152A via a POE cable 12 to the switching device 152B, and the power source voltage is distributed from the switching device 152B to each function unit 111, the wires for power source in the in-vehicle network can be further reduced.

Therefore, in the control method performed in the in-vehicle communication system in the first embodiment of the present disclosure, an in-vehicle network having a simpler configuration in which wires are effectively reduced can be realized.

The switching device according to the first embodiment of the present disclosure relays via a POE cable 12 information between a plurality of function units 111 mounted to the vehicle 101. In a control method performed by the switching device according to the first embodiment of the present disclosure, first, a power source voltage is extracted from the POE cable 12. Next, the extracted power source voltage or a voltage based on the power source voltage is supplied via a POE cable 12 to each of one or a plurality of function units 111 connected to the switching device.

Thus, with the configuration in which the power source voltage is distributed via a POE cable 12 to each of the function units 111 and the switching device 152, the length of wires for communication can be reduced, and further, the wires for power source in the in-vehicle network can be reduced.

Therefore, in the control method performed in the switching device according to the first embodiment of the present disclosure, an in-vehicle network having a simpler configuration in which wires are effectively reduced can be realized.

Next, another embodiment of the present disclosure is described with reference to the drawings. In the drawings, the same or corresponding parts are denoted by the same reference signs, and description thereof is not repeated.

Second Embodiment

The present embodiment relates to an in-vehicle communication system that includes a switching device that can control supply of a power source voltage, when compared with the in-vehicle communication system according to the first embodiment. The contents other than the contents described below are the same as those in the in-vehicle communication system according to the first embodiment.

Figure 9:
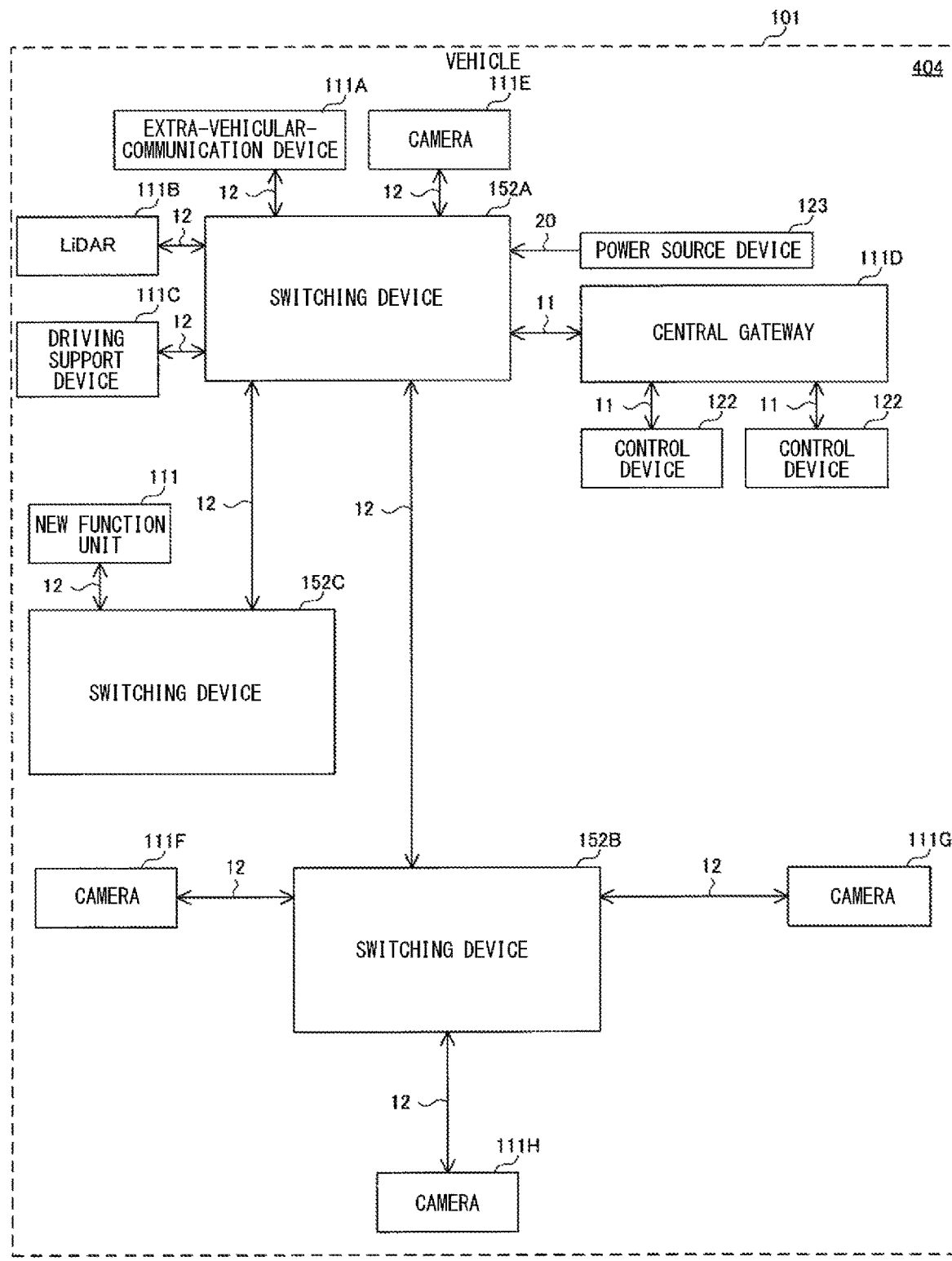
FIG. 9 shows an example of a configuration of an in-vehicle communication system according to a second embodiment of the present disclosure.

FIG. 9 shows an example of a configuration of an in-vehicle communication system according to a second embodiment of the present disclosure.

With reference to FIG. 9, when compared with the in-vehicle communication system 403, an in-vehicle communication system 404 further includes a switching device 152C that provides a bus to which a new function unit 111 for expanding the function of the in-vehicle communication system can be added. Hereinafter, each of the switching devices 152A, 152B, 152C will also be referred to as a switching device 152.

[Control of Supply of Power Source Voltage]

The switching device 152C can switch whether or not to supply a power source voltage for each function unit 111 connected to the switching device 152C.

Figure 10:
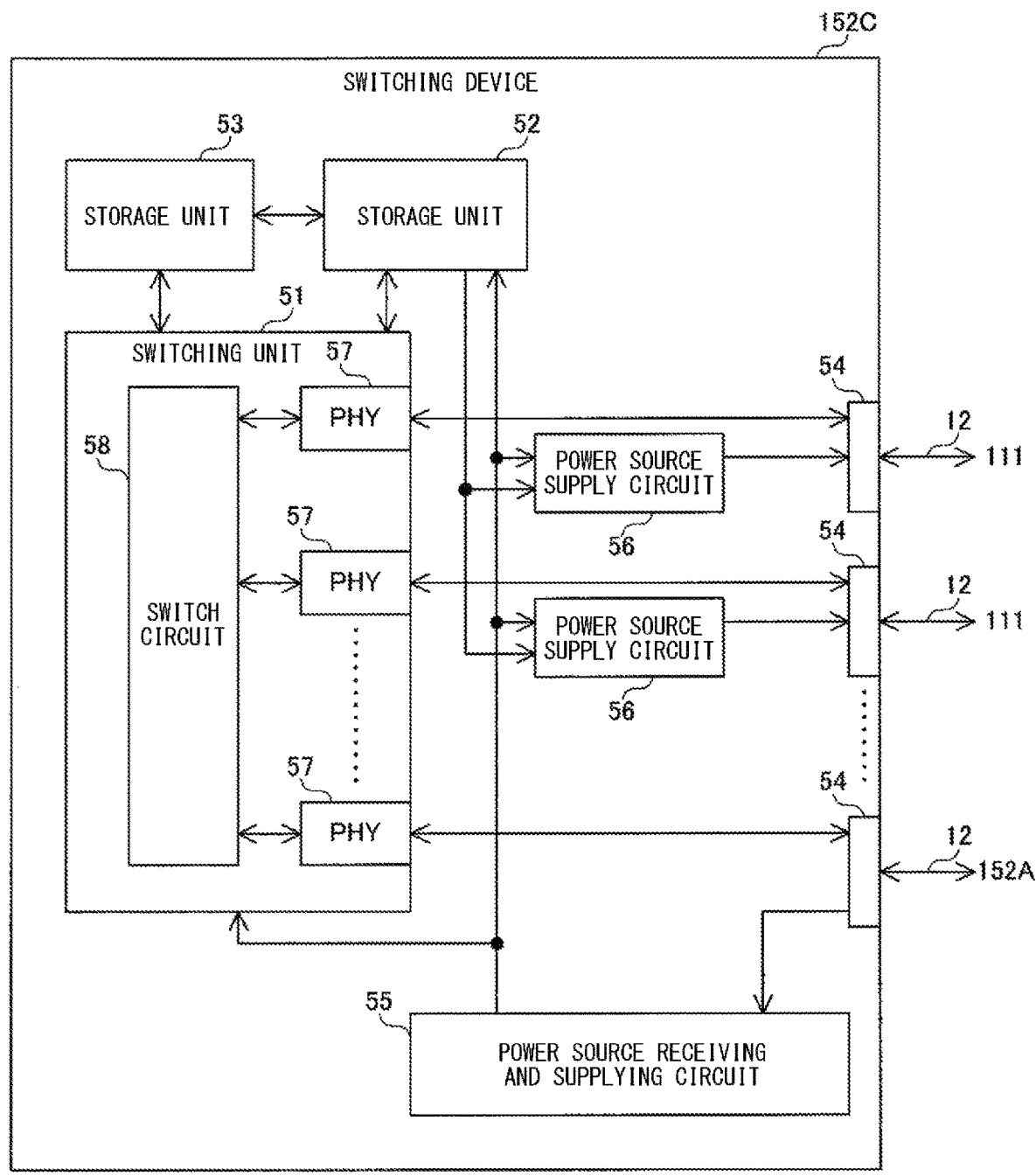
FIG. 10 shows an example of a configuration of a switching device according to the second embodiment of the present disclosure.

FIG. 10 shows an example of a configuration of a switching device according to the second embodiment of the present disclosure.

With reference to FIG. 10, the switching device 152C further includes a processing unit 52, when compared with the switching device 152B shown in FIG. 6. The processing unit 52 operates in accordance with the power source voltage received from the power source receiving and supplying circuit 55, for example.

The processing unit 52 in the switching device 152C outputs, to a power source supply circuit 56, a control signal for controlling whether or not to perform supply of the power source voltage by the power source supply circuit 56, for example.

For example, in the switching device 152C, when no function unit 111 is connected to any of the communication ports 54, the processing unit 52 outputs to each power source supply circuit 56, a control signal for stopping supply of the power source voltage by the power source supply circuit 56.

Accordingly, each power source supply circuit 56 stops supply of the power source voltage to a corresponding communication port 54 in accordance with the control signal received from the processing unit 52.

Meanwhile, in the switching device 152C, when a function unit 111 is connected to one or a plurality of communication ports 54, the processing unit 52 outputs, to the corresponding power source supply circuit 56, a control signal for causing the power source supply circuit 56 to supply the power source voltage.

The power source supply circuit 56 outputs the power source voltage to a corresponding communication port 54 in accordance with the control signal received from the processing unit 52.

In the in-vehicle communication system 404, not limited to the configuration in which the switching device 152C can switch whether or not to supply the power source voltage for each function unit 111 connected to the switching device 152C, a configuration in which the switching devices 152A, 152B also include the processing unit 52 and can perform a similar process, may be adopted. That is, a configuration in which at least one of the switching devices 152A, 152B, 152C can switch whether or not to supply the power source voltage for each function unit 111 connected thereto, may be adopted.

With reference to FIG. 9 again, the switching device 152A may control whether or not to cause the switching device 152C to supply the power source voltage to a function unit 111.

With reference to FIG. 9 and FIG. 10, for example, when a new function unit, which is a function unit 111 that is new, has been connected to the switching device 152C, the processing unit 52 in the switching device 152C outputs, to a corresponding power source supply circuit 56, a control signal for causing the power source supply circuit 56 to supply the power source voltage.

The power source supply circuit 56 outputs the power source voltage to a corresponding communication port 54 in accordance with the control signal received from the processing unit 52.

As a result, the new function unit is supplied with the power source voltage from the power source supply circuit 56 via the corresponding communication port 54 and a POE cable 12.

With reference to the above-described address table in the storage unit 53, for example, the processing unit 52 confirms that the MAC address of the connection destination device of the communication port 54, i.e., the new function unit, is not registered in the address table, and creates an Ethernet frame that includes an authentication request for requesting the MAC address and authentication information of the new function unit.

Then, the processing unit 52 transmits the created Ethernet frame to the new function unit, via the switching unit 51, a corresponding communication port 54, and a POE cable 12.

The new function unit receives the Ethernet frame transmitted from the switching device 152C, and acquires the authentication request included in the received Ethernet frame.

Then, the new function unit creates an Ethernet frame that includes the MAC address and authentication information of the new function unit in accordance with the acquired authentication request, and transmits the created Ethernet frame to the switching device 152C.

The switching unit 51 in the switching device 152C receives the Ethernet frame transmitted from the new function unit. More specifically, the switch circuit 58 in the switching unit 51 receives the Ethernet frame via a POE cable 12, the corresponding communication port 54, and the corresponding interface circuit 57.

Then, the switch circuit 58 stores the received Ethernet frame into the storage unit 53, and confirms the destination MAC address of the Ethernet frame. Then, with reference to the above address table, the switch circuit 58 outputs, to the processing unit 52, information to the effect that the confirmed destination MAC address indicates the switching device 152C.

The processing unit 52 transmits the authentication information received from the new function unit, to the switching device 152A.

More specifically, upon reception of the above information from the switch circuit 58, the processing unit 52 acquires, from the storage unit 53, the Ethernet frame including the MAC address of the new function unit and stored by the switch circuit 58.

Then, the processing unit 52 transmits, to the switching device 152A, an Ethernet frame in which the destination MAC address of the acquired Ethernet frame is changed to the destination MAC address of the switching device 152A, via the switching unit 51, a corresponding communication port 54, and a POE cable 12.

The processing unit 52 adds, to the above address table in the storage unit 53, the MAC address of the new function unit included in the acquired Ethernet frame in association with the port number of the communication port 54 through which the Ethernet frame has been received, whereby the processing unit 52 updates the address table.

With reference to FIG. 5 again, the switching unit 51 in the switching device 152A receives the Ethernet frame transmitted from the switching device 152C. More specifically, the switch circuit 58 in the switching unit 51 receives the Ethernet frame via a POE cable 12, a corresponding communication port 54, and a corresponding interface circuit 57.

Then, the switch circuit 58 stores the received Ethernet frame into the storage unit 53, and confirms the destination MAC address of the Ethernet frame. Then, with reference to the above address table, the switch circuit 58 outputs, to the processing unit 52, information to the effect that the confirmed destination MAC address indicates the switching device 152A.

Upon reception of the information from the switch circuit 58, the processing unit 52 acquires, from the storage unit 53, the Ethernet frame stored by the switch circuit 58, and on the basis of the authentication information included in the acquired Ethernet frame, the processing unit 52 performs an authentication process regarding the new function unit.

Then, the processing unit 52 transmits, to the switching device 152C, power source control information indicating whether or not to supply the power source voltage to the new function unit.

More specifically, when the authentication process regarding the new function unit has been successful, the processing unit 52 creates an Ethernet frame that includes, as the power source control information, an instruction to continue supply of the power source voltage by the switching device 152C, and transmits the created Ethernet frame to the switching device 152C via the switching unit 51, a corresponding communication port 54, and a POE cable 12.

Meanwhile, when the authentication process regarding the new function unit has failed, the processing unit 52 creates an Ethernet frame that includes, as the power source control information, an instruction to stop supply of the power source voltage by the switching device 152C, and transmits the created Ethernet frame to the switching device 152C via the switching unit 51, a corresponding communication port 54, and a POE cable 12.

With reference to FIG. 9 and FIG. 10 again, the switching unit 51 in the switching device 152C receives the Ethernet frame transmitted from the switching device 152A. More specifically, the switch circuit 58 in the switching unit 51 receives the Ethernet frame via a POE cable 12, the corresponding communication port 54, and the corresponding interface circuit 57.

Then, the switch circuit 58 stores the received Ethernet frame into the storage unit 53, and confirms the destination MAC address of the Ethernet frame. Then, with reference to the above address table, the switch circuit 58 outputs, to the processing unit 52, information to the effect that the confirmed destination MAC address indicates the switching device 152C.

Upon reception of the information from the switch circuit 58, the processing unit 52 acquires, from the storage unit 53, the Ethernet frame stored by the switch circuit 58, acquires the power source control information included in the acquired Ethernet frame, and switches whether or not to supply the power source voltage to the new function unit, in accordance with the acquired power source control information.

More specifically, when having acquired, from the Ethernet frame, an instruction to continue supply of the power source voltage by the switching device 152C, the processing unit 52 continues output, to the corresponding power source supply circuit 56, a control signal for causing the power source supply circuit 56 to supply the power source voltage.

Meanwhile, when having acquired, from the Ethernet frame, an instruction to stop supply of the power source voltage by the switching device 152C, the processing unit 52 outputs, to the corresponding power source supply circuit 56, a control signal for stopping supply of the power source voltage by the power source supply circuit 56.

The power source supply circuit 56 stops output of the power source voltage to the corresponding communication port 54 in accordance with the control signal received from the processing unit 52.

As a result, the power source voltage is no longer supplied to the new function unit from the power source supply circuit 56 via the corresponding communication port 54 and a POE cable 12.

Figure 11:
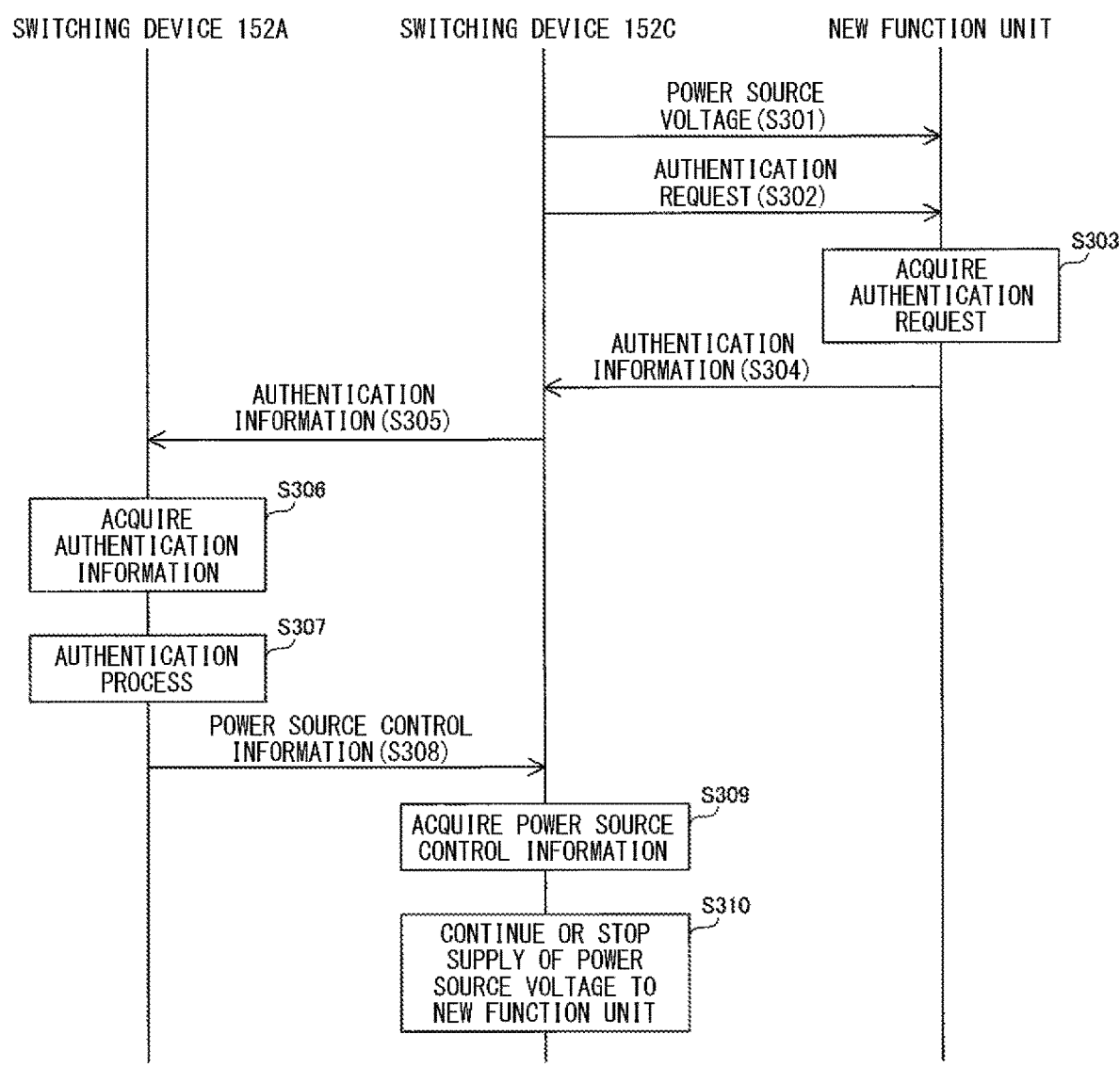
FIG. 11 shows an example of a sequence according to which a power source voltage is supplied to a new function unit in the in-vehicle communication system according to the second embodiment of the present disclosure.

FIG. 11 shows an example of a sequence according to which a power source voltage is supplied to a new function unit in the in-vehicle communication system according to the second embodiment of the present disclosure.

With reference to FIG. 11, first, when a new function unit has been connected to the switching device 152C, the switching device 152C supplies a power source voltage to the new function unit via a corresponding communication port 54 of the switching device 152C and a POE cable 12 (step S301).

Next, the switching device 152C creates an Ethernet frame that includes an authentication request for requesting the MAC address and authentication information of the new function unit, and transmits the created Ethernet frame to the new function unit via the POE cable 12 (step S302).

Next, the new function unit receives the Ethernet frame transmitted from the switching device 152C, and acquires the authentication request included in the received Ethernet frame (step S303).

Next, the new function unit creates an Ethernet frame that includes the authentication information in accordance with the acquired authentication request, and transmits the created Ethernet frame to the switching device 152C via the POE cable 12 (step S304).

Next, the switching device 152C receives the Ethernet frame including the authentication information and transmitted from the new function unit, and transmits the received Ethernet frame to the switching device 152A via a POE cable 12 (step S305).

Next, the switching device 152A receives the Ethernet frame transmitted from the switching device 152C, and acquires the authentication information included in the received Ethernet frame (step S306).

Next, the switching device 152A performs an authentication process regarding the new function unit, on the basis of the acquired authentication information (step S307).

Next, in accordance with the result of the authentication process, the switching device 152A creates an Ethernet frame that includes power source control information indicating whether or not to supply the power source voltage to the new function unit, and transmits the created Ethernet frame to the switching device 152C via the POE cable 12 (step S308).

Next, the switching device 152C receives the Ethernet frame transmitted from the switching device 152A, and acquires the power source control information included in the received Ethernet frame (step S309).

Next, in accordance with the acquired power source control information, the switching device 152C continues supply of the power source voltage to the new function unit, or stops supply of the power source voltage to the new function unit (step S310).

In the in-vehicle communication system according to the second embodiment of the present disclosure, when a new function unit has been connected to the switching device 152C, the switching device 152A performs an authentication process on the basis of the authentication information from the new function unit, so as to switch whether or not to supply the power source voltage to the new function unit, in accordance with the result of the authentication process. However, the present disclosure is not limited thereto. In the in-vehicle communication system 404, the switching device 152C may perform the authentication process, so as to switch whether or not to supply the power source voltage to the new function unit, in accordance with the result of the authentication process.

The in-vehicle communication system according to the second embodiment of the present disclosure includes the switching device 152B. However, the present disclosure is not limited thereto. The in-vehicle communication system 404 need not necessarily include the switching device 152B.

As described above, in the in-vehicle communication system according to the second embodiment of the present disclosure, at least one of the switching devices 152A, 152B, 152C can switch whether or not to supply the power source voltage, for each function unit 111 connected thereto.

With this configuration, control of power source supply to each function unit 111 can be concentrated in the switching device 152, and thus, the control system in the in-vehicle network can be simplified.

In the in-vehicle communication system according to the second embodiment of the present disclosure, when a new function unit, which is a function unit 111 that is new, has been connected to the switching device 152C, the switching device 152C transmits, to the switching device 152A, authentication information received from the new function unit; receives, from the switching device 152A, power source control information indicating whether or not to supply the power source voltage to the new function unit; and switches whether or not to supply the power source voltage to the new function unit, in accordance with the received power source control information.

With this configuration, the configurations for authentication regarding a new function unit and power source supply control can be simplified while the in-vehicle network is allowed to be expandable.

The other configurations and operations are the same as those described in the in-vehicle communication system according to the first embodiment, and thus, detailed description is not repeated here.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

An in-vehicle communication system comprising a first switching device and a second switching device each configured to relay, via a transmission path, information between a plurality of function units mounted to a vehicle, wherein upon being supplied with a power source voltage via a power-source-dedicated line from a power source device mounted to the vehicle, the first switching device supplies a power source voltage via the transmission path to one or a plurality of the function units and the second switching device that are connected to the first switching device, the second switching device extracts a power source voltage from the transmission path, and supplies a power source voltage via the transmission path to one or a plurality of the function units that are connected to the second switching device, the first switching device and the second switching device are disposed separately on a front side and a rear side of the vehicle, the first switching device operates as a layer 2 switch or a layer 3 switch, and the second switching device operates as a layer 2 switch.

[Additional Note 2]

A switching device comprising:

a switching unit configured to relay, via a transmission path, information between a plurality of function units mounted to a vehicle;

a power source receiving and supplying circuit configured to extract a power source voltage from the transmission path; and a power source supply circuit configured to supply, via the transmission path, the power source voltage extracted by the power source receiving and supplying circuit or a voltage based on the power source voltage, to one or a plurality of the function units that are connected to the switching device, wherein the switching device operates as a layer 2 switch or a layer 3 switch.

REFERENCE SIGNS LIST

10 Ethernet cable
11 CAN bus
12 POE cable
20 dedicated line
51 switching unit
52 processing unit
53 storage unit
54 communication port
55 power source receiving and supplying circuit
56 power source supply circuit
57 interface circuit
58 switch circuit
101 vehicle
111 function unit
111A extra-vehicular-communication device
111B LiDAR
111C driving support device
111D central gateway
111E, 111F, 111G, 111H camera
122 control device
123 power source device
151, 151A, 151B, 152, 152A, 152B, 152C switching device
161 wireless base station device
201 external device
401, 402, 403, 404 in-vehicle communication system

The invention claimed is:

1. An in-vehicle communication system comprising:
a first switching device and a second switching device each configured to relay information between a plurality of function devices mounted to a vehicle, wherein
upon being supplied with a first power source voltage via a power-source-dedicated line from a power source device mounted to the vehicle, the first switching device (i) supplies a second power source voltage via a first transmission path to a first function device of the plurality of function devices or a first plurality of function devices of the plurality of function devices that are connected to the first switching device and (ii) supplies a third power source voltage via a second transmission path to the second switching device, the second switching device extracts the third power source voltage from the second transmission path, and supplies a fourth power source voltage via a third transmission path to at least one second function device of the plurality of function devices that is connected to the second switching device, the second switching device is capable of switching whether or not to supply the fourth power source voltage, for each of the plurality of function devices connected to the second switching device, and when a new function device has been connected to the second switching device, the second switching device:
transmits a request for a media access control (MAC) address and authentication information to the new function device,
receives the MAC address and the authentication information transmitted by the new function device in accordance with the request,
updates an address table using the MAC address received from the new function device,
transmits, to the first switching device, the authentication information received from the new function device,
receives, from the first switching device, power source control information indicating whether or not to supply a fifth power source voltage to the new function device, and
switches whether or not to supply the fifth power source voltage to the new function device, in accordance with the power source control information received.

2. The in-vehicle communication system according to claim 1, wherein
the first switching device is capable of switching whether or not to supply the second power source voltage, for each of the plurality of function devices connected thereto.

3. A switching device comprising:
a switching unit configured to relay, via a plurality of transmission paths, information between a plurality of function devices mounted to a vehicle;
a power source receiving and supplying circuit configured to extract a first power source voltage from a first transmission path; and
a power source supply circuit configured to supply, via a second transmission path, a second power source voltage based on the first power source voltage extracted by the power source receiving and supplying circuit, to at least one of a plurality of the function devices that are connected to the switching device, wherein
the power source supply circuit is capable of switching whether or not to supply the second power source voltage, for each of the plurality of function devices connected to the switching device,
when a new function device is connected to the switching device, the switching device,
transmits a request for a media access control (MAC) address and authentication information to the new function device, receives the MAC address and the authentication information transmitted by the new function device in accordance with the request, updates an address table using the MAC address received from the new function device, receives, in accordance with the authentication information received from the new function device, power source control information indicating whether or not to supply a third power source voltage to the new function device, and switches whether or not the power source supply circuit supplies the third power source voltage to the new function device, in accordance with the power source control information received by the switching unit.

4. A control method to be performed in an in-vehicle communication system including a first switching device and a second switching device each configured to relay information between a plurality of function devices mounted to a vehicle, the control method comprising:

a step, performed by the first switching device upon being supplied with a first power source voltage via a power-source-dedicated line from a power source device mounted to the vehicle, of (i) supplying a second power source voltage via a first transmission path to at least one function device of the plurality of function devices that are connected to the first switching device and (ii) supplying a third power source voltage via a second transmission path to the second switching device;

a step, performed by the second switching device, of extracting the third power source voltage from the second transmission path and supplying a fourth power source voltage via a third transmission path to at least one function device of the plurality of function devices that are connected to the second switching device; and steps of, when a new function device has been connected to the second switching device, by the second switching device:

transmitting a request for a media access control (MAC) address and authentication information to the new function device, updating an address table using the MAC address received from the new function device;

transmitting, to the first switching device, the authentication information received from the new function device;

receiving, from the first switching device, power source control information indicating whether or not to supply a fifth power source voltage to the new function device; and switching whether or not to supply the fifth power source voltage to the new function device, in accordance with the power source control information received.

5. A control method to be performed in a switching device configured to relay information between a plurality of function devices mounted to a vehicle, the control method comprising:

a step of extracting a first power source voltage from a first transmission path;

a step of supplying, via a second transmission path, a second voltage based on the extracted first power source voltage, to at least one of the plurality of function devices connected to the switching device; and steps of, when a new function device is connected to the switching device, by the switching device:

transmitting a request for a media access control (MAC) address and authentication information to the new function device;

updating an address table using the MAC address received from the new function device;

receiving, in accordance with the authentication information received from the new function device, power source control information indicating whether or not to supply a third power source voltage to the new function device; and switching whether or not to supply the third power source voltage to the new function device, in accordance with the power source control information received.

\* \* \* \* \*